United States Patent [19]

Buck

[11] 4,442,847
[45] Apr. 17, 1984

[54] HARVESTER AIR INTAKE SCREEN AND ACCESS DOOR WITH OPENING AND CLOSING MECHANISM

[75] Inventor: Robert T. Buck, Independence, Mo.

[73] Assignee: Allis-Chalmers Corporation, Milwaukee, Wis.

[21] Appl. No.: 362,832

[22] Filed: Mar. 29, 1982

[51] Int. Cl.³ ............................................ A01F 12/48
[52] U.S. Cl. ............................... 130/27 Z; 130/27 R
[58] Field of Search .......................... 130/27 Z, 27 R; 56/14.6, 13.3, 16.5

[56] References Cited

U.S. PATENT DOCUMENTS 3,402,720 9/1968 Rowland-Hill .................. 130/27 R

Primary Examiner—Jay N. Eskovitz
Attorney, Agent, or Firm—Charles L. Schwab

[57] ABSTRACT

A screen door assembly (61) on the bottom of a combine serves to screen large pieces of foreign material from air flowing to a fan (49) and to provide access for service personnel to an interior cavity (53) of the combine. A screen (62) is moved between a closed horizontal position and an open position, shown by broken lines (62"), by a crank arm member (63) which can be operated (pivoted) by a wrench (91) engaged with the hex head (89) of a shaft portion (86). A pin (111) locks the crank arm member (63), and the screen in their screen closed position in which the screen and arms rest on laterally inward extending flanges (106, 107). The rear edges (116, 117) of the flanges (106, 107) serve to guide the screen (62) to its open position as the crank arm member (63) is rotated counterclockwise, as viewed in FIG. 2 from its full line screen closed position to its screen open position shown by broken lines (63").

9 Claims, 5 Drawing Figures

HARVESTER AIR INTAKE SCREEN AND ACCESS DOOR WITH OPENING AND CLOSING MECHANISM

BACKGROUND OF THE INVENTION

1. Technical Field

This invention relates to a combine harvester utilizing a cleaning fan and particularly to the provision of an intake screen for such a fan which also serves as an access door to service components of the combine from an interior cavity.

2. Prior Art

Heretofore, a horizontal screen has been used at the bottom of a combine main frame for screening out large pieces of crop material and the like. The horizontal screen of one prior art construction is downwardly removable as a unit after releasable fasteners are released. Removal of the screen provided access to an interior service cavity. Also heretofore, a prior art fan intake screen has been used which slides horizontally on a guide mechanism between open and close positions. In opening the prior screens, the trash accumulated on the top of the screen often ended up being dumped on the operators who, necessarily, were beneath the combine to open the screens. In opening the horizontally slidable screen it may become jammed on the trash accumulated on top of the screen. When this happens, the trash must be removed before the screen can be slid horizontally to its full open position.

BRIEF DESCRIPTION OF THE INVENTION

The combined screen and access door of this invention is particularly useful in a harvester having a main frame supported at its rear end by a pair of steerable wheels and at its front end by a pair of drive wheels, an engine, a power train including a change speed transmission between the engine and the drive wheels, an elevated crop processor, a header, means conveying crop material from the header to the crop processor including an upwardly and rearwardly extending conveyor with a housing, a pair of vertical side walls, a transverse fan between the side walls and a duct extending upwardly from the fan. The side walls, fan, duct and conveyor housing define an interior cavity by which a person has servicing access to the fan, conveyor and transmission. The combined air inlet screen and access door arrangement includes a screen door assembly at the bottom of the cabity whose components include a screen and crank arm means having a pair of crank arms at laterally opposite sides of the screen. First corresponding ends of the crank arms are pivotally connected to the screen on a first horizontal transverse axis and second corresponding ends of the crank arms are pivotally mounted on the main frame on a second horizontal transverse axis by pivot means including a shaft part rigidly secured to one of the crank arms in coaxial relation to the second transverse axis. The shaft part is operable to rotate the one crank arm about the second transverse axis. Abutment means are provided on the main frame and screen assembly to limit rotation of the crank arm means in one direction about the second axis wherein the screen is in its closed position. The crank arm means is rotatable, by rotation of the shaft part, from a first position in which the screen is in its horizontal position to a second position in which the screen is shifted to an open position exposing a doorway at the bottom of the cavity through which a serviceperson may enter the cavity. A wrench receiving end may be formed on the shaft part to facilitate opening and closing the screen door by an operator standing at one lateral side of the combine using a suitable wrench.

BRIEF DESCRIPTION OF THE DRAWINGS

One embodiment of the invention is shown in the drawings in which.

DETAILED DESCRIPTION OF THE DRAWINGS

Figure 1:
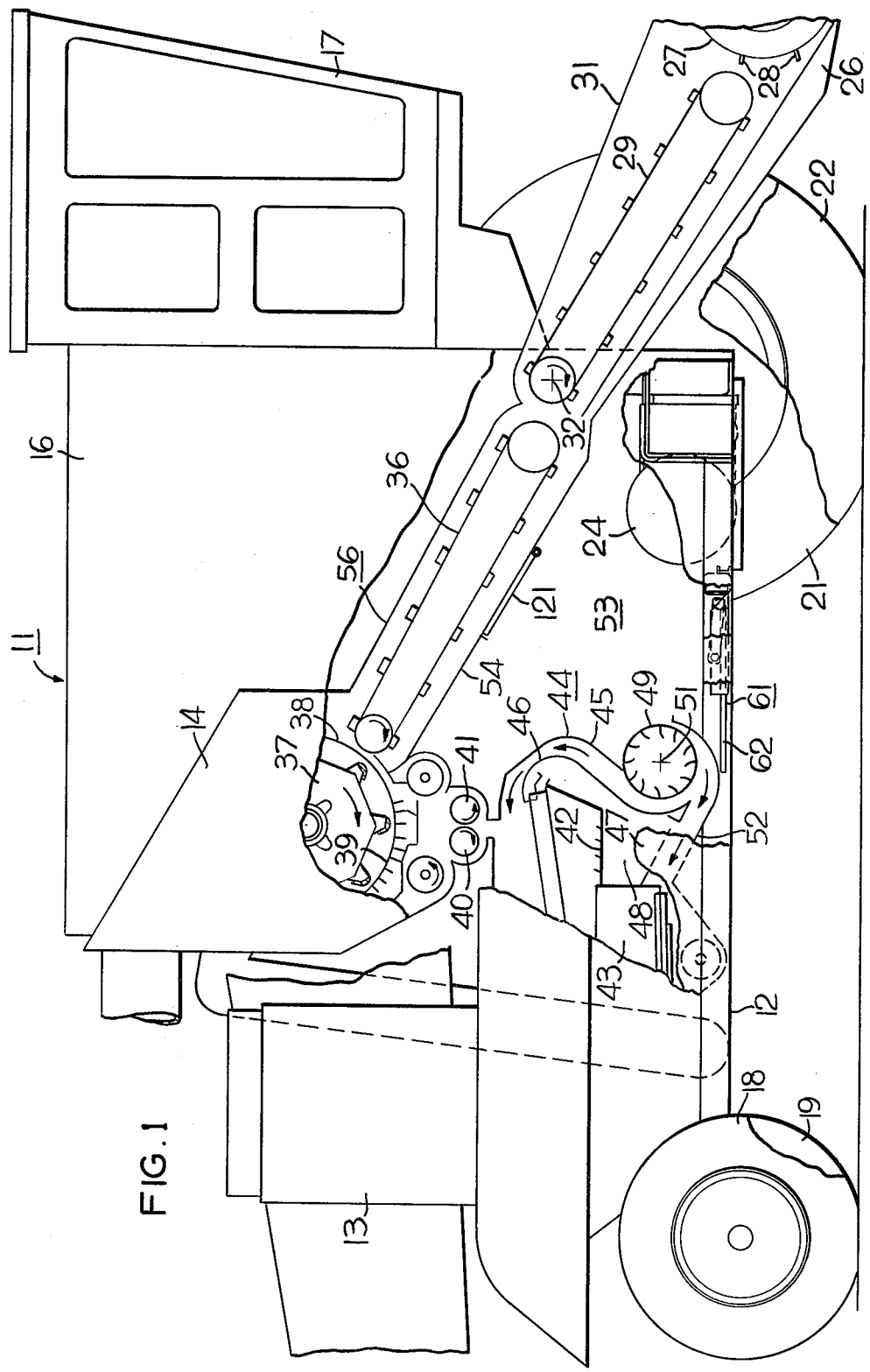
FIG. 1 is a side view of a combine with parts broken away showing the screen door in a closed position.

Referring to FIG. 1, the combine 11 in which the present invention is incorporated includes a main frame 12 on which an engine 13, a processor 14, a grain tank 16 and an operator's cab 17 are mounted. The main frame 12 is supported at its rear end by a pair of steerable wheels 18, 19 and at its front end by a pair of drive wheels 21, 22 driven by the engine through a power train which includes a change speed transmission 24. The combine 11 includes a header 26 having a transverse auger 27 which conveys cut crop material to a central part of the header where retractable fingers 28 on the auger 27 move the cut crop material rearwardly to an endless chain slat conveyor 29 within a conveyor housing 31. The conveyor housing 31 is secured at its front end to the header 26 and has its rear end pivotally connected on a transverse axis 32 to the frame 12 for vertical swinging movement under the control of hydraulic actuators, not shown. The combine also includes an upper feeder conveyor 36 which receives material from the lower conveyor 29 and delivers it to the rotating rotor 37 of the processor 14. The grain or seed separated from the crop material as it moves through the processor 14 is discharged through a perforated screen 38 and a concave 39 to a pair of accelerator rolls 40 and 41 which accelerate the material downwardly to a grain pan 42 of the cleaning shoe assembly 43 across a rearwardly directed air stream emerging from an upper air duct 44 defined by duct walls 45, 46 and side walls 47, 48. A transverse fan 49, disposed between and supported on a transverse axis 51 by the side walls 47, 48, delivers air to the upper air duct 44 and to an air duct 52 conveying air to the underside of the cleaning shoe 43. The fan 49 draws air from an interior cavity 53 defined in part by the side walls 47, 48, the duct 44 and a bottom wall 54 of a conveyor housing 56 for the upper conveyor 36.

A screen door assembly 61 is horizontally disposed at the bottom of the cavity 53 and serves as an air inlet screen for the fan 49 thereby preventing large crop segments and the like from being drawn into the fan. The screen door assembly 61 includes a screen door 62 which is shiftable between a horizontal closed position shown in solid lines in FIGS. 1, 2 and 3 to partially open and fully open positions shown in broken lines 62' and 62", respectively, in FIG. 2, by a crank arm operating member 63 whose partially open and fully open positions are shown by broken lines 63' and 63", respectively. In the open position of the combine fan screen and access door 62, shown in broken lines 62" in FIG. 2, a serviceperson can enter the cavity 53 through the open bottom doorway defined by side frame beams 71, 72, a transverse beam 73 and the front edge of the screen 62 in its open position shown by broken lines 62".

The crank arm operating mechanism 63 includes a pair of arms 76, 77 having corresponding ends welded to cylindrical portions 78, 79 of a two part transverse pivot member or shaft 81. The other corresponding ends of the arms 76, 77 are pivotally connected to the side beams 71, 72, constituting the lower portions of the side walls 47, 48 of the combine frame 12, for pivotal movement about a transverse pivot axis 82. Arm 77 includes a transverse pivot element 83 extending into an aligned cylindrical opening 84. Arm 76 includes a stub shaft 86 welded thereto and extending through pivot openings 87, 88 in the side walls of side beam 71. Element 83, stub shaft 86 and openings 84, 87, 88 are axially aligned on transverse axis 82. A hex head 89 is formed on the free end of the stub shaft 86 and is disposed to one laterally outer side of the combine so as to be accessible to the operator. Operation of the crank arm assembly is achieved through use of an appropriate wrench 91 with a socket portion engaging the hex head 89 of the stub shaft 86.

Figure 3:
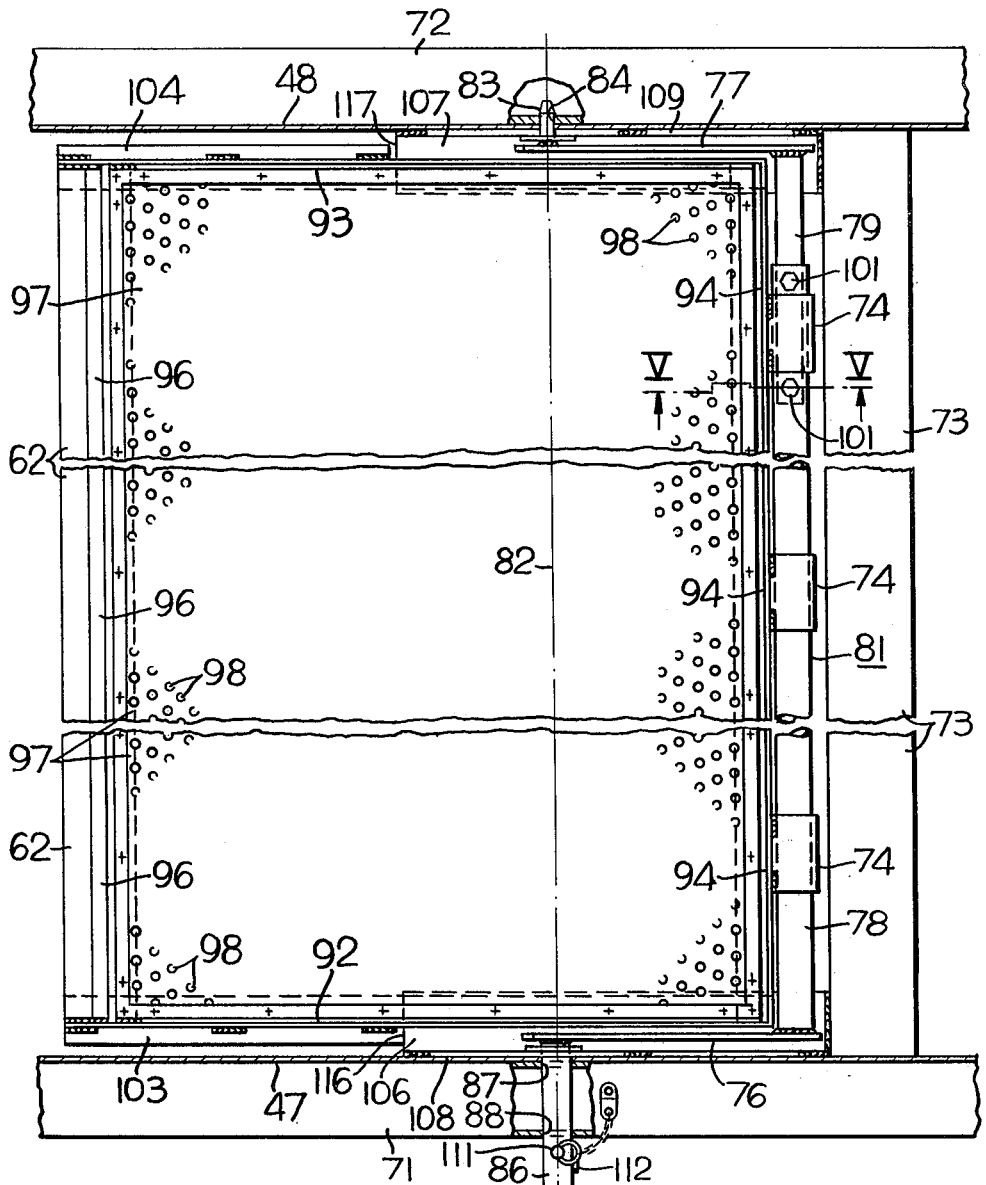
FIG. 3 is a view taken along the line III—III in FIG. 2.
Figure 4:
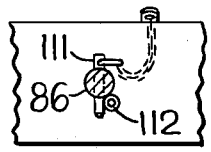
FIG. 4 is a view taken along the line IV—IV in FIG. 3.
Figure 5:
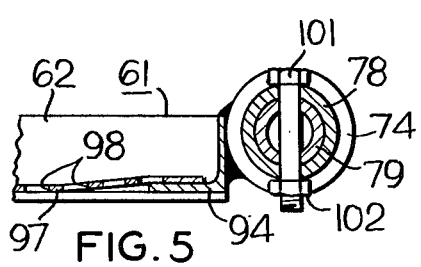
FIG. 5 is a view taken along the line V—V in FIG. 3.

The screen 62 is fabricated by welding together a rectangular frame of angle members 92, 93, 94 at the sides and front and a box beam 96 at the rear. A foraminous screen element in the form of a steel plate 97 with punched openings 98 is welded at its edges to the horizontal flanges of the angle members 92, 93, 94 and a horizontal lip of beam 96. A plurality of cylindrical pivot members 74 are welded to the front angle member 94 and have coaxial radially inward facing bearing surfaces in bearing contact with the cylindrical outer surface of shaft portion 78. The position of the pivot members 74 in the open position of the screen 62 is shown by broken lines 74". Shaft portion 79 telescopically fits within shaft portion 78 and is secured thereto by a pair of bolts 101 and nuts 102, as shon in FIGS. 3 and 5. As seen in FIG. 3, a pair of longitudinal members 103, 104 are welded to laterally opposite sides of the rear one-half of the screen 62 and serve to partially fill the lateral gap between the screen sides and the side beams 71, 72 so as to restrict entrance of crop material to the cavity 53.

Figure 2:
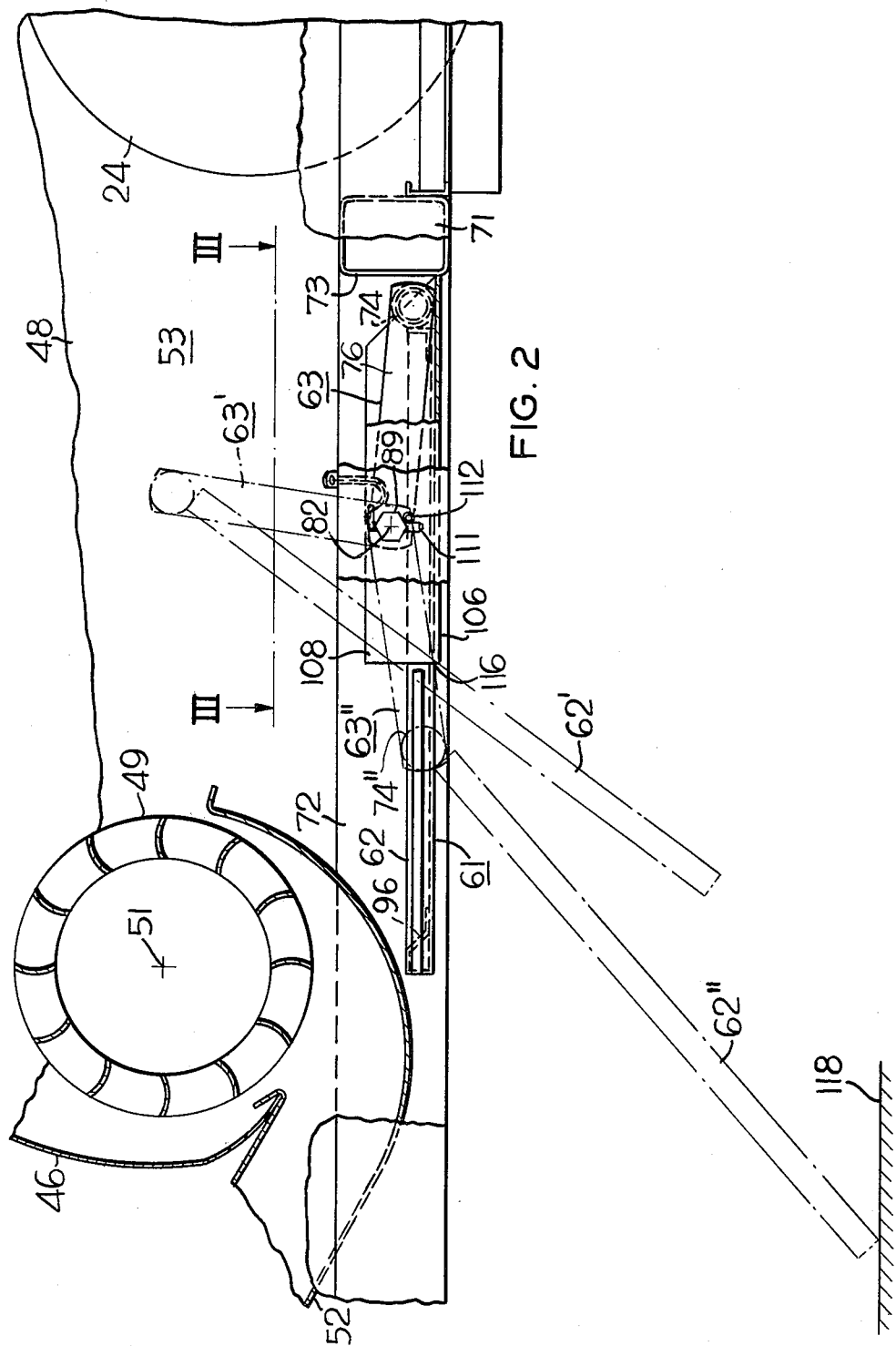
FIG. 2 is an enlarged side view of part of the combine shown in FIG. 1 with parts broken away for illustration purposes.

As shown in FIGS. 2 and 3, in which the screen 62 is in a closed, horizontal position, approximately the front one-half of the screen angle members 92, 93 rest on horizontally inwardly extending flanges 106, 107 of angle members 108, 109 secured by welding to the inboard sides of the side beams 71, 72. The flanges 106, 107 also serve as abutments to limit clockwise rotation of the crank arm mechanism 63, as viewed in FIG. 2. A removable pin 111 is installed in a bore in stub shaft 86 transverse to the shaft axis 82 and extends downward to abut with an abutment element 112 welded to the side beam 71. The cooperative engagement of pin 111 with abutment element 112 prevents the screen 62 moving from its closed position to an open position. Thus, the pin 111 and the element 112 serve as a latch or lock mechanism.

OPERATION

When it is desired to open the combined screen and access door assembly 63, the pin 111 is removed, the wrench 91 is engaged with the hex head 89 of stub shaft 86 and the crank arm assembly 63 is rotated counterclockwise, as viewed in FIG. 2. The rear edges 116, 117 of the supporting angle flanges 106, 107 serve as a fulcrum for the screen 62 as it slides rearwardly and downwardly. As the rear end of the screen approaches the ground 118, the operator lifts it up with his free hand so the crank arm mechnaism 63 can swing to its rearmost open position 63" which is approximately 180 degrees from its closed position. In the open position of the crank arm assembly 63, the arms 76, 77 abut the rear edges 116, 117 of the support flanges 106, 107, thus serving to limit counterclockwise rotation of the assembly 63. With the screen 62 opened, the operator or serviceperson can enter the cavity 53 to service combine components and assemblies accessible from the cavity such as the fan 49, the transmission 24 and the upper conveyor 36 which is accessible through a service door 121 in the floor 54. As is apparent from the drawings and description, the screen and access door assembly 61 can be opened without a person needing to be beneath the combine and the crop material accumulated on top of the screen 62 can be dumped without discomfort to the operator or serviceperson. Likewise, the screen 62 can be moved to its closed position by a person standing at the righthand side of the combine using the wrench 91.

The embodiments of the invention in which an exclusive property or privilege is claimed are defined as follows:

1. In a harvester having a main frame supported at its rear end by a pair of steerable wheels and at its front end by a pair of drive wheels, an engine, a power train including a change speed transmission between the engine and the drive wheels, an elevated crop processor, a header, means conveying crop material from the header to the crop processor including an upwardly and rearwardly extending conveyor with a housing, a pair of verical side walls, a fan between said side walls and a duct extending upwardly from said fan, said side walls, fan, duct and conveyor housing defining an interior cavity from which a person has servicing access to said fan, conveyor and transmission, a combined air inlet screen and access door arrangement characterized by a screen door assembly at the bottom of said cavity including a transverse screen having a horizontal closed position, crank arm means including a pair of crank arms at laterally opposite sides of said screen having first corresponding ends pivotally connected to said screen on a first horizontal transverse pivot axis and second corresponding ends pivotally mounted on said main frame on a second horizontal transverse pivot axis by pivot means including a shaft part rigidly secured to one of said crank arms in coaxial relation to said second transverse axis and operable to rotate said one crank arm about said transverse axis, and abutment means on said main frame and screen assembly engagable to limit rotation of said crank arm means in one direction about said second axis wherein said screen is in its horizontal closed position, said crank arm means being rotatable by rotation of said shaft part from a first position in which said screen is in a horizontal closed position to a second position in which said screen is shifted to an open position exposing a doorway at the bottom of said cavity through which a serviceperson may enter the cavity.

2. The combination of claim 1 wherein said abutment means includes a pair of horizontal flanges extending laterally inwardly from the lower portions of said side walls in underlying relationship to substantial portions of laterally opposite edges of said screen when the latter is in its horizontal closed position.

3. The combination of claim 1 wherein said abutment means includes first means on said combine limiting rotation of said crank arm means in one direction wherein said screen is in its closed horizontal position and second means on said combine limiting rotation of said crank arm means in the opposite direction wherein said screen is in its open position.

4. The combination of claims 1, 2 or 3 and further comprising releasable latch means operable to prevent rotation of said crank arm means from its first position.

5. The combination of claim 1 wherein said crank arm means includes a transverse member rigidly interconnecting said crank arms.

6. The combination of claim 5 wherein said transverse member is pivotally connected to one longitudinal end of said screen.

7. The combination of claim 6 wherein said transverse member includes two portions with engaging ends in telescopic relationship and fastening means releasably securing said engaging ends to one another.

8. The combination of claim 1 wherein said shaft part includes a wrench receiving portion accessible from one lateral side of said combine.

9. The combination of claims 1 or 8 wherein said first axis is spaced horizontally from said second axis in the closed position of said screen.

* * * * *